No. 720,350. PATENTED FEB. 10, 1903.
A. S. HUBBARD.
SYSTEM OF DISTRIBUTION.
APPLICATION FILED DEC. 17, 1901.
NO MODEL. 3 SHEETS—SHEET 2.

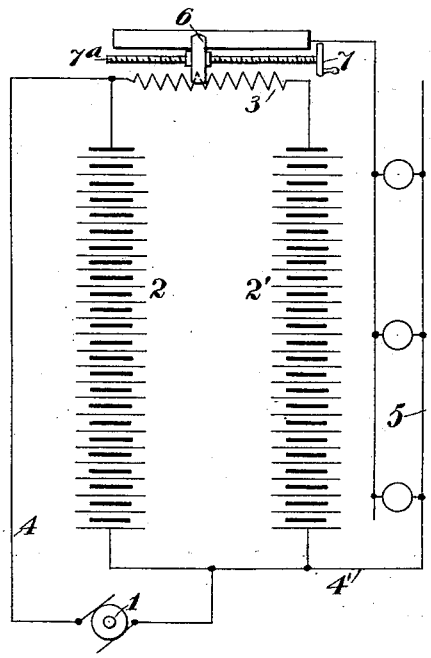
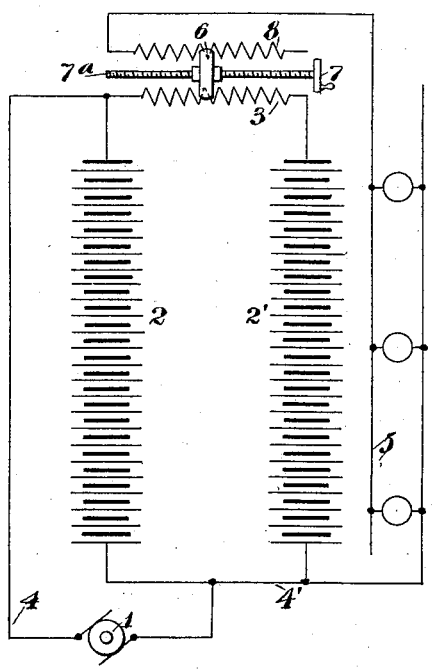

Witnesses
Wm P Hammond
P. F. Sonnek

Inventor
Albert S. Hubbard
by
[signature]
Attys

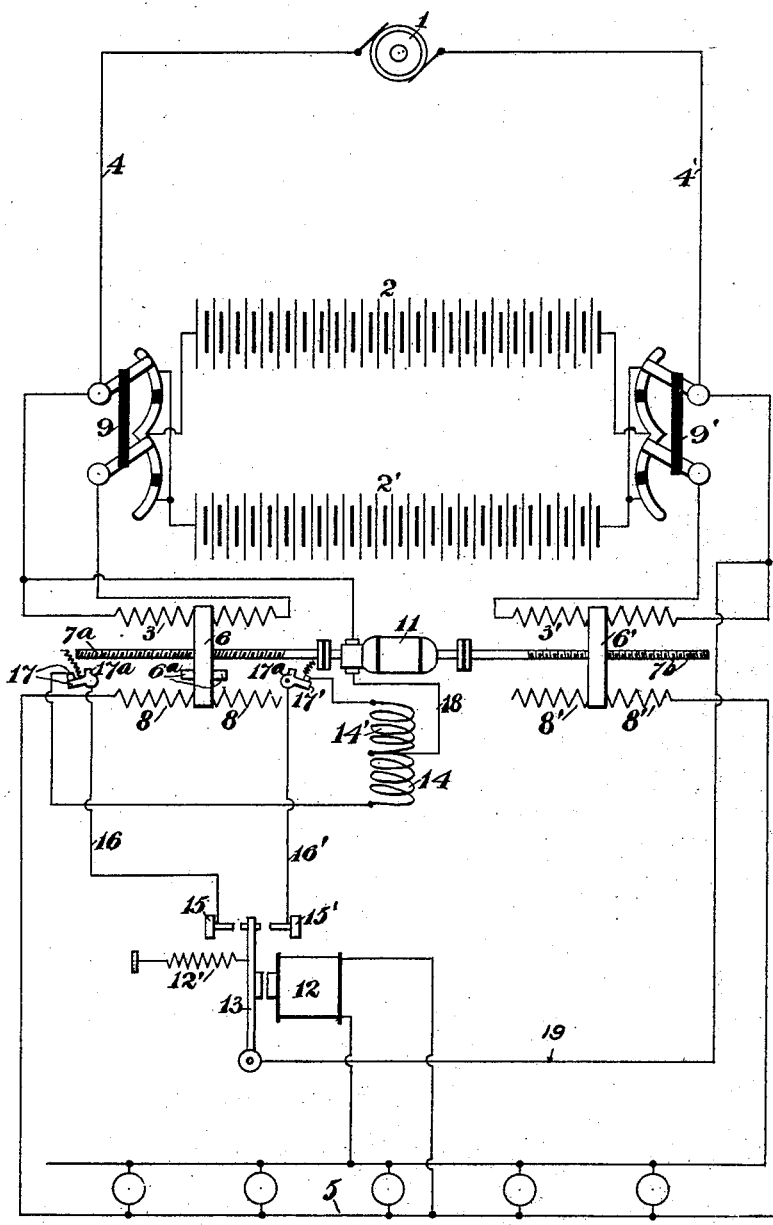

UNITED STATES PATENT OFFICE.

ALBERT S. HUBBARD, OF GREENWICH, CONNECTICUT, ASSIGNOR TO CHARLES M. GOULD, OF BAYSIDE, LONG ISLAND, NEW YORK.

SYSTEM OF DISTRIBUTION.

SPECIFICATION forming part of Letters Patent No. 720,350, dated February 10, 1903.

Application filed December 17, 1901. Serial No. 86,256. (No model.)

*To all whom it may concern:*

Be it known that I, ALBERT S. HUBBARD, a citizen of the United States, residing at Greenwich, in the county of Fairfield and State of Connecticut, have invented certain new and useful Improvements in Systems of Distribution, of which the following is a specification.

This invention relates to improvements in systems of distribution, and particularly to a system wherein two storage batteries are connected in parallel to a generator or charging-circuit and to a consumption-circuit, with a resistance or electromotive-force reducer between the charging-circuit and one of the batteries, so that one battery receives a higher voltage and tends to charge from the generator, while the other battery receives a lower voltage from the generator and tends to discharge to the consumption-circuit. By interchanging these batteries at intervals the necessary conditions for continual charging of one battery and discharging of another battery are maintained. In such a system any large variation in the number of translating devices, such as lights or motors in circuit, will result in considerable fluctuation of intensity of the remaining lights or of speed of the remaining motors. Similarly the dropping in voltage of the discharging battery will correspondingly affect the translating devices. To overcome these difficulties, I make the connection of the consumption-circuit to the resistance intermediate the battery connections, and I make this connection to the resistance adjustable differentially, so as to approach one or the other of the battery connections, so that whatever be the conditions of load and battery-voltage the potential at the translating devices may be maintained constant within reasonable limits. The adjustment of this connection may be made by hand or it may be automatic, under control of electromagnetic devices responsive to the voltage in the translating-circuit. The same switch that controls this resistance connection may also control another resistance directly in the translating-circuit connection, so as to further regulate the potential and said circuit.

Figure 3:
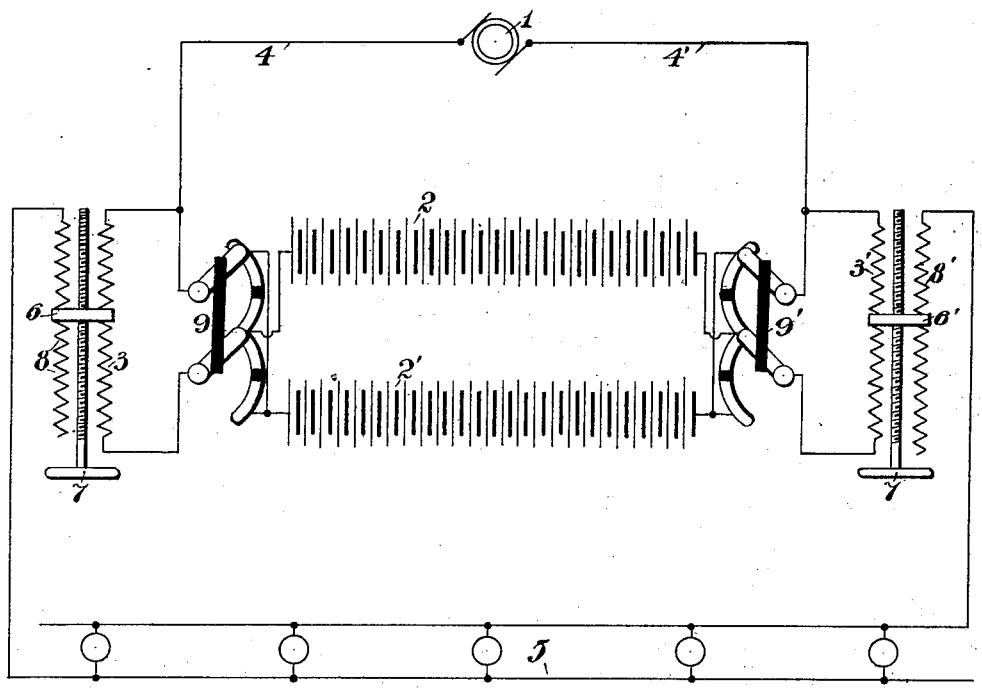
Figure 4:
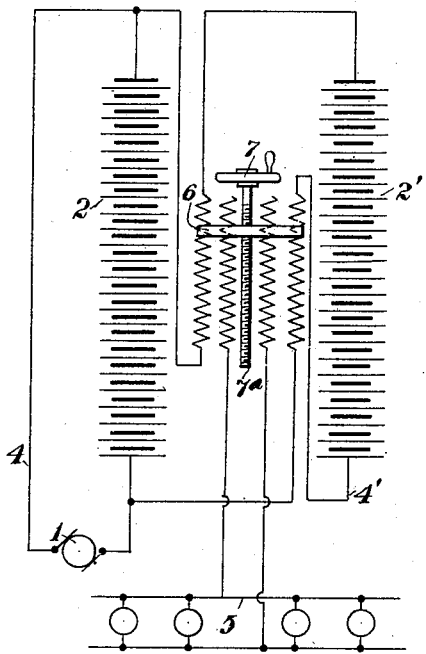

In the accompanying drawings, Figure 1 is a diagram of a system of distribution embodying my invention, showing a manually-operated switch for controlling the resistance connection. Fig. 2 is a similar view showing the supplementary resistance in the translating-circuit connection. Fig. 3 is a diagram showing the application of the system in connection with a transfer-switch to interchange the batteries. Fig. 4 is a view similar to Fig. 2, showing a double-pole arrangement for the adjustable resistance-switch. Fig. 5 shows the application of automatic controlling means to the system.

Referring to Fig. 1, the generator is indicated at 1 and the two storage batteries at 2 2' and the intervening resistance at 3, the storage batteries being connected by the charging-circuit wires 4 4' in parallel, so that the generator is connected to battery 2 directly and to battery 2' through resistance 3. Consequently the electromotive force impressed from the generator on the battery 2' is less than that on the battery 2 by an amount depending on the drop in the resistance 3. The consumption or load circuit (indicated at 5) is connected at one side to the generator and the common return of the batteries and on the other side to a switch 6, whose movable part or contact is adapted to engage suitable contacts to connect different parts of the resistance 3, according to the position of said switch. The switch has a handle 7, whereby its position may be adjusted so as to maintain a desired condition of potential on the translating-circuit, this handle operating the switch in the form shown by a screw 7ª, working in the switch-contact, which acts as a nut thereon. Thus if more lights are switched into said circuit the attendant will note the fall in intensity due to increased drop in the circuit and will move switch 6 so that its contact will approach the higher potential end of resistance 3. This causes a higher electromotive force to be delivered to the circuit 5 to make up for increased drop and prevents an objectionably high rate of discharge in battery 2'.

In Fig. 2 the switch 6 is shown as coöperating with another rheostat or resistance 8, included in the connection of circuit 5, in such manner that when the switch is moved to a point of higher potential on resistance 3 the resistance of the connection to circuit 5 will be decreased, so as to increase the regulating effect.

Fig. 3 shows a system wherein compensating rheostats 3 6 8 and 3' 6' 8' are arranged on each side of the battery and consumption-circuit with separate operating-handles 7 7', and transfer-switches 9 9' are provided for interchanging the storage batteries relatively to the generator and the consumption-circuit, so that each battery may be connected for charging by putting it on the generator side of resistance 3 or may be connected for discharging by putting it on the load-circuit side of said resistance. In the position shown the upper battery is discharging and the lower battery is being charged.

The form of resistance 3 or rheostat 6 8 may be varied in any desired manner. For example, it may be made double pole, so as to act on both sides of the circuit at once, as indicated in Fig. 4, a single cross contact-arm 6 coöperating with all four of the resistances 3 3' 8 8'. In this way the effect of a given movement of the switch device may be doubled.

In some cases it is desirable to render the operation of the regulating device automatic, and for this purpose I arrange the system as shown in Fig. 5, wherein the resistance-switches 3 6 8 and 3' 6' 8' are arranged as in Fig. 3 as regards the general circuits; but the operating spindles or screws 7$^a$ 7$^b$ of said switches are both attached to the armature 11 of a common operating-motor, which operates the said switches simultaneously and correspondingly. This motor is controlled by a relay 12, connected across the translating-circuit so as to be responsive to the electromotive force of that circuit at the point or place of consumption. The armature 13 of this relay coöperates with contacts 15 15', connected by circuits 16 16' with the motors aforesaid, the armature thereof being driven in one direction or the other, according to which of these contacts is closed. For reversing the motor either the armature or the field may be reversed. I here show a field-reversing arrangement, the field-magnet of the motor having two coils 14 14', connected through spring-switches 17 17' with the contacts 15 15', the other side of these coils being connected by wire 18 through the armature with the other side of the circuit. The armature 13 is under normal conditions of electromotive force held out of contact with both contacts 14 14' by the opposing action of magnet 12 and a spring 12'. If the load increases, causing voltage to drop, the spring 12$^a$ will draw the armature 13 to contact 14, and a current impulse will pass from main circuit 4, by wire 18, through armature 11 and field-coil 14, switch 17, circuit 16, contact 15, relay-armature 13, and a wire 19 with the other side 4' of the main circuit. The armature 11 is then rotated by this current until it has moved the switch-contacts 6 6' sufficiently to restore the proper electromotive force conditions on the consumption-circuit, whereupon the armature 13 resumes its open position. On reverse conditions an inverse action occurs. When the switch device 6 reaches either end of its path of movement, its lug 6$^a$ strikes the tail 17$^a$ of one of the switches 17 17' and opens that switch, thereby preventing further operation of the motor in that direction.

Having thus described my invention, the following is what I claim as new therein and desire to secure by Letters Patent:

1. A system of distribution comprising a plurality of storage batteries, a generator and a consumption-circuit, a resistance between the batteries, said resistance variably connected with the consumption-circuit to vary differentially the resistance between the batteries.

2. A system of distribution comprising a charging-circuit, two storage batteries connected thereto in parallel, a resistance interposed between said batteries and connected to said charging-circuit, and a switch device variably connecting the consumption-circuit with said resistance.

3. A system of distribution comprising a charging-circuit, two storage batteries connected thereto in parallel, a consumption-circuit, resistance connected between the batteries and a switch device coöperating with said resistance and connecting the consumption-circuit with variable points of such resistance, and an adjustable resistance in the connection to said consumption-circuit.

4. A system of distribution comprising a charging-circuit, two storage batteries connected thereto in parallel, a resistance between said storage batteries, a consumption-circuit and a resistance in the connection to said circuit, and an adjustable switch device coöperating with both of said resistances to vary the point of connection of the consumption-circuit to the first-named resistance and to vary the amount of resistance from this point of connection to the consumption-circuit.

5. A system of distribution comprising a charging-circuit, two storage batteries connected thereto in parallel, a resistance interposed between one of said storage batteries and the charging-circuit, a consumption-circuit and a resistance therein, and a switch device coöperating with both of said resistances, to simultaneously and similarly vary the amount of both resistances included between the consumption-circuit and the generator.

6. A system of distribution comprising a plurality of storage batteries, a charging-circuit and a consumption-circuit, a resistance between the batteries, a switch device variably connecting said resistance with the consumption-circuit and automatic adjusting means for said switch.

7. A system of distribution comprising a plurality of storage batteries, a charging-circuit and a consumption-circuit, a resistance between the batteries, a switch device variably connecting said resistance with the consumption-circuit, and electromagnetic means responsive to the electromotive force of the consumption-circuit for adjusting said switch.

8. A system of distribution comprising a plurality of batteries, a charging-circuit and a consumption-circuit, a resistance between the batteries, a switch device variably connecting said resistance with the consumption-circuit, an electric motor responsive to the electromotive force of the consumption-circuit to adjust said switch.

9. A system of distribution comprising a plurality of storage batteries, a charging-circuit and a consumption-circuit, a resistance between the batteries, a switch device variably connecting said resistance with the consumption-circuit, an electric motor operating said switch and electromagnetic means responsive to the electromotive force of the consumption-circuit controlling the motor.

10. A system of distribution comprising a plurality of storage batteries, a charging-circuit and a consumption-circuit, a resistance between the batteries, a switch device variably connecting said resistance with the consumption-circuit, an electric motor operating said switch, a relay connected across the consumption-circuit and circuits controlled by said relay to operate the said motor in either direction.

11. A system of distribution comprising a plurality of storage batteries, a charging-circuit and a consumption-circuit, a resistance between the batteries, a switch device variably connecting said resistance with the consumption-circuit, an electric motor operating said switch, a relay connected across the consumption-circuit and circuits controlled by said relay to operate the said motor in either direction, circuit-breaking switches in said circuits arranged adjacent to the ends of the path of the switch device, and means on the switch device to engage said circuit-breaking switches at each end of its travel.

12. A system of distribution comprising a charging-circuit and a storage battery connected thereto, another storage battery connected to the charging-circuit through a resistance, a consumption-circuit and a switch device variably connecting same to the aforesaid resistance, and electromagnetic means responsive to the electromotive force of the consumption-circuit and controlling the operation of said switch device.

13. A system of distribution comprising a charging-circuit and a storage battery connected thereto, another storage battery connected to the charging-circuit through a resistance, a consumption-circuit and a switch device variably connecting same to the aforesaid resistance, an electric motor operating said switch device, and electromagnetic means responsive to the electromotive force of the consumption-circuit and controlling the operation of said motor.

14. A system of distribution comprising a charging-circuit and a storage battery connected thereto, another storage battery connected to the charging-circuit through a resistance, a consumption-circuit and a switch device variably connecting same to the aforesaid resistance, an electric motor operating said switch device, and electromagnetic means responsive to the electromotive force of the consumption-circuit and controlling the operation of said motor, said electromagnetic means consisting of a relay connected to the consumption-circuit, and circuits controlled by said relay to operate said motor in opposite directions, and circuit-breaking switches in said circuits operated by said switch device to open the operating-circuit when the switch device reaches either end of its travel.

15. A system of distribution comprising a charging-circuit, two storage batteries connected thereto in parallel, a resistance interposed between one of said batteries and said charging-circuit, a consumption-circuit, a switch device variably connecting the consumption-circuit to the said resistance, and a switching means for interchanging the storage-battery connections relatively to the charging-circuit and the consumption-circuit.

16. A system of distribution comprising a charging-circuit, two storage batteries connected thereto in parallel, a consumption-circuit, resistance connected between the batteries, and a switch device coöperating with said resistance and connecting the consumption-circuit with variable points of such resistance, an adjustable resistance in the connection to said consumption-circuit, and a switching means for interchanging the storage-battery connections relatively to the charging-circuit and the consumption-circuit.

17. A system of distribution comprising a plurality of storage batteries, a charging-circuit and a consumption-circuit, resistances between the batteries at each of their poles, a switch device for each of said resistances variably connecting said resistances with the consumption-circuit.

18. A system of distribution comprising a plurality of storage batteries, a charging-circuit and a consumption-circuit, resistances between the batteries at each of their poles, a switch device for each of said resistances variably connecting said resistances with the consumption-circuit, and means to control said switch devices simultaneously and in like manner.

19. A system of distribution comprising a plurality of storage batteries, a charging-circuit and a consumption-circuit, resistances between the batteries at each of their poles, a switch device for each of said resistances variably connecting said resistances with the consumption-circuit, and means responsive to the electromotive force of the consumption-circuit to control said switch devices simultaneously and in like manner.

20. A system of distribution comprising a plurality of storage batteries, a charging-circuit and a consumption-circuit, resistances between the batteries at each of their poles, a switch device for each of said resistances variably connecting said resistances with the consumption-circuit, an electric motor responsive to the electromotive force of the consumption-circuit operating said switch devices simultaneously and in like manner.

ALBERT S. HUBBARD.

Witnesses:
A. P. KNIGHT,
J. GREEN.